US011778329B2

(12) United States Patent
Fretter

(10) Patent No.: US 11,778,329 B2
(45) Date of Patent: Oct. 3, 2023

(54) APPARATUS AND METHOD FOR RECORDING DATA TO PRODUCE A LOCALIZED PANORAMIC IMAGE OF A STREET AND METHOD RELATED THERETO

(71) Applicant: Parkling GmbH, Berlin (DE)

(72) Inventor: Christoph Fretter, Berlin (DE)

(73) Assignee: Parkling GmbH, Berlin (DE)

(*) Notice: Subject to any disclaimer, the term of this patent is extended or adjusted under 35 U.S.C. 154(b) by 199 days.

(21) Appl. No.: 17/176,761

(22) Filed: Feb. 16, 2021

(65) Prior Publication Data

US 2021/0266459 A1 Aug. 26, 2021

(30) Foreign Application Priority Data

Feb. 24, 2020 (EP) ..................................... 20159008

(51) Int. Cl.
*H04N 23/698* (2023.01)
*G06F 16/29* (2019.01)
(Continued)

(52) U.S. Cl.
CPC ........... *H04N 23/698* (2023.01); *G01S 17/89* (2013.01); *G06F 16/29* (2019.01); *G06T 3/4038* (2013.01); *G06T 19/003* (2013.01); *H04B 11/00* (2013.01)

(58) Field of Classification Search
CPC ..... H04N 5/23238; G06F 16/29; G01S 17/89; G06T 3/4038; G06T 19/003; H04B 11/00
See application file for complete search history.

(56) References Cited

U.S. PATENT DOCUMENTS 10,762,782 B2 9/2020 Shurkhovetskyy et al.
2002/0090143 A1* 7/2002 Endo .................. G06T 1/00
382/284

(Continued)

FOREIGN PATENT DOCUMENTS

DE 102018214510 A1 3/2019

OTHER PUBLICATIONS

Anonymous: "Virb Series Owner's Manual", May 14, 2014 (May 14, 2014), XP055738495, Gefunden im Internet: URL:http://static.garmin.com/pumac/VIRB_OM_EN.pdf [gefunden am Oct. 9, 2020].

(Continued)

*Primary Examiner* — On S Mung
(74) *Attorney, Agent, or Firm* — HARNESS, DICKEY & PIERCE, P.L.C.

(57) ABSTRACT

An apparatus is disclosed for recording data to produce a localized panoramic image of a street. The apparatus uses a camera and a device for satellite-based position and time determination, as well as a storage unit. A preparation device is provided which encodes time data of the device for satellite-based position and time determination into a format recordable for the camera and forwards this to the camera. The camera is designed to simultaneously record these data and record a continuous film. The storage unit stores the film with the time data as well as position and time data obtained from the device for satellite-based position and time determination. Furthermore, the apparatus operates in accordance with a method for producing a localized panoramic image.

15 Claims, 3 Drawing Sheets

(51) Int. Cl.
   *G01S 17/89*   (2020.01)
   *G06T 3/40*    (2006.01)
   *G06T 19/00*   (2011.01)
   *H04B 11/00*   (2006.01)

(56) References Cited

U.S. PATENT DOCUMENTS

2018/0227694 A1* 8/2018 King ................ H04S 7/302
2020/0128902 A1* 4/2020 Brown ............... A42B 3/042

OTHER PUBLICATIONS

Anonymous: "Precision GPS Time Video Overlay Unit", Apr. 13, 2017 (Apr. 13, 2017), XP055738497, Gefunden im Internet: URL:https://www.blackboxcamera.com/pic-osd/docs/GPSBOXSPRITE.pdf [gefunden am Oct. 9, 2020].
Anonymous: "Linear timecode—Wikipedia", Aug. 4, 2019 (Aug. 4, 2019), XP055738488, Gefunden im Internet: URL:https://en.wikipedia.org/w/index.php?title=Linear_timecode&oldid=909352895[gefunden am Oct. 9, 2020].
Anonymous: "Google's Street View Cameras—More Than Meets the Eye", Dec. 20, 2019 (Dec. 20, 2019), XP055738507, Gefunden im Internet: URL:https://www.trekview.org/blog/2019/google-street-view-cameras-more-than-meets-the-eye/[gefunden am Oct. 9, 2020].
European Search Report issued in 20159008.0, dated Oct. 19, 2020 (in German).

* cited by examiner

APPARATUS AND METHOD FOR RECORDING DATA TO PRODUCE A LOCALIZED PANORAMIC IMAGE OF A STREET AND METHOD RELATED THERETO

CROSS REFERENCE TO RELATED APPLICATION

This application claims the benefit and priority of German Patent Application No. 20 159 008.0, Feb. 24, 2020. The entire disclosure of the above application is incorporated herein by reference.

TECHNICAL FIELD

The invention relates to an apparatus for recording data to produce a localized panoramic image of a street with a camera and a device for satellite-based position and time determination. In addition, the apparatus has a storage unit. Furthermore, the invention relates to a method for recording data to produce a localized panoramic image of a street.

BACKGROUND

As a result of the increasing population growth in urban regions, traffic is increasing. In particular, this is also true for individual traffic in passenger cars. Especially in inner-city areas, this massive increase in traffic density leads to problems which cause a shortage of space that can no longer be solved by simple means. Further problems are not only the concomitant noise pollution through traffic, but also the exposure to contaminants which, in the meantime, is being increasingly regarded with concern.

Studies have shown that approximately 30% of inner-city traffic is not classical transportation traffic from one destination to another, but rather can be ascribed to vehicles travelling simply in search of a parking space.

Projections for Germany reveal that 1.9 billion hours are spent by drivers in vehicles simply searching out parking spaces. For this, 3.2 billion liters of fuel are consumed. All in all, an economic loss in the amount of 40.4 billion Euro is assumed.

Therefore, the call for a parking space management system that reduces this vehicle traffic in search of a parking space makes its presence felt to an increasing extent.

In the case of such systems, a basic distinction is made between two states of data ascertainment. On the one hand, static data would have to be obtained. Static data would indicate where parking spaces are located, at which times parking in these parking spaces is permitted, as well as provide information as to how the parking spaces are to be parked in, e.g., as lengthways or cross-wise parking. This also includes information about no-parking zones as well as possible parking fees. Such data are referred to as static data and constitute the fundamental prerequisite for a parking space management system.

The second state of data ascertainment resides in ascertaining so-called dynamic data which represent information on the current parking space occupancy situation.

One possibility of ascertaining static data is known from DE 10 2018 214 510 A1 for example. In this case, however, only information as to whether a parking space is available or not can be ascertained. Data indicating at which times parking is permitted or whether a given parking space is actually just a driveway, for example, can only be established with great difficulty.

On the one hand, it is known from the Google STREET VIEW® program, for example, that by means of vehicles georeferenced panoramic images, i.e., 360° images, are produced from different positions in a street. However, such data are not enough to generate sufficient information required for the calculation of static parking space data. For instance, the positions of individual permitted parking spaces cannot be ascertained at all or only with great difficulty. Similarly, data on allowed parking times and the like are often not visible either.

Another challenge resides in the fact that for a localized panoramic image of a street, the images produced need to be provided with the corresponding location information. If, in analogy to the Google STREET VIEW® program, individual images are produced, this is in most cases possible without any problem. However, as soon as images that are close to each other timewise are to be produced in a continuous method, this task poses considerable problems as it requires high accuracy of the location information.

SUMMARY

The invention is therefore based on the object to provide an apparatus and a method for recording data to produce a localized panoramic image of a street which is of particular location accuracy.

In accordance with the invention this object is achieved by an apparatus having the features recited in the pending claims.

Advantageous embodiments of the invention are stated in the appended claims, the description as well as the Figures and their explanation.

The apparatus according to the invention has a preparation device which is designed to prepare time data of the device for satellite-based position and time determination into a format recordable for a camera as coded time data, and to forward this to the camera for recording. Furthermore, the camera is designed to simultaneously record a continuous film and the coded time data as a film with time data. The storage unit is in turn designed and configured to store the film with the time data, and to also store position and time data of the device for satellite-based position and time determination.

The invention is based on several ideas that are effective in combination with each other. On the one hand, the realization was made that for a sufficiently precise panoramic image of a street that can be used to ascertain static data for a parking space management system, it is insufficient, or not efficient enough, to record individual still images. Therefore, according to the invention a continuous film is produced. This is recorded, e.g., by a vehicle when moving along a street.

On the other hand, the realization was furthermore made that linking of the position data of the device for satellite-based position and time determination with the film is not possible or only possible with disproportionately great effort. In particular, this would have to be implemented in a precise manner so that no undesirable offset arises between the position data and the images of the film.

To solve this problem, according to the invention, the time or a time signal originating from the device for satellite-based position and time determination is prepared by the preparation device into a format recordable for the camera and forwarded to the camera. The camera records these time data as a prepared time format, hereinafter referred to as coded time data, together with the actual visual film data. This has the effect that the corresponding coded time data that indicate a point in time are precisely connected to the image, for which the corresponding position data of the device for satellite-based position and time determination were also ascertained.

Finally, according to the invention, on the one hand the film with the coded time data, and the position and time data originating from the device for satellite-based position and time determination, are stored on the storage unit.

In a downstream evaluation it is thus possible, by way of the coded time data in the film and the time data linked with the position data, to ascertain the precise position of each image of the film.

The device for satellite-based position and time determination can for instance be a device operating according to the GPS, Galileo, Glonas and/or Beidou standard, or a combination thereof.

In a preferred embodiment the preparation device for producing the coded time data is designed to prepare and issue the coded time data as an acoustic signal and forward this to the camera. In this way, separately to the image data, a second channel existing in a standard film can be used to record the data. Basically, it would also be possible to feed an additional image signal into the camera, which would then necessitate a corresponding superimposing of the external images to be recorded with the second image signal, which proves to be complicated on the one hand and on the other hand would also entail losses in the quality of the recorded continuous film.

Basically, the time data can be coded in any chosen way. It is advantageous if the preparation device is configured to produce the coded time data as a continuous time data stream with a frame for each time-stamp. In other words, data that each contain a time-stamp are continuously being transmitted to the camera. This time-stamp is then recorded and stored together with the continuous film. Through a comparison of the coded time-stamp recorded on the film with the corresponding parallel time-stamp from the device for satellite-based position and time determination, which is also stored on the storage unit, the precise position of each image of the continuous film can thus be ascertained.

By preference, the continuous film is recorded with 24 images per second. Basically, even higher image rates of e.g., 25, 30 or also 60 images can be provided. The greater the number of images that are generally recorded the higher the precision of the localized panoramic image of a street obtained later on.

Basically, any chosen coding methods can be employed to produce the coded time data. However, it is preferred if the coded time data are produced in a SMPTE-Itc-compliant manner. This is a time code introduced by the Society of Motion Pictures and Television Engineers that is used in television and studio applications for video and audio synchronization. As a standard, the time thus coded contains information on the hour, minute, second and the corresponding frame of the film, in which case this information depends on the recording standard used.

To achieve an even better accuracy, according to the invention data on milli- and microseconds are inserted as user bit load into the frame. This means that in addition to the aforementioned information of the hour, minute, second and the frame, still further information on the millisecond and microseconds is present in each time-stamp.

To produce the time signal as a basis of these data the preparation device can have a quartz crystal, for example, which is adjusted by a time signal of the device for satellite-based position and time determination. This signal can be a seconds signal for example. It is known that quartz crystals are temperature-sensitive and show a drift so that it is necessary to repeatedly adjust the signal of the coded time data produced by the preparation device. For this purpose, e.g. a time signal of the device for satellite-based position and time determination can be used in accordance with the invention. The seconds signal is suitable for this.

According to the invention provision, for example, provision is made in that for adjustment of the coded time data the preparation device is configured to stop and/or repeat one or several frames of the time data stream. This is done in order to adjust the coded time data by means of the time signal of the device for satellite-based position and time determination.

In other words, if, based on a time signal transmitted by the device for satellite-based position and time determination, the preparation device detects that its coded time signal is behind the time, the current production of the time data stream is stopped and continued with the correct information. However, if the preparation device detects that it is too fast, i.e., that its time is ahead of the time indicated by the device for satellite-based position and time determination, then individual frames or parts of the frames in the time data stream are repeated in order to thereby be adjusted again to the correct point in time.

A higher data accuracy for the production of a localized panoramic image of a street can be accomplished if a LIDAR sensor unit with a LIDAR sensor is additionally provided. This unit can be configured to receive at least the time data and/or position data of the device for satellite-based position and time determination, and in turn issues the distance data ascertained by the LIDAR sensor together with the time data and/or position data which are stored in the storage unit.

In doing so, in the subsequent production of the localized panoramic image of a street, further information on the precise distance of the camera to the next object is available. This provides a further data basis.

Furthermore, the invention relates to a method for recording data to produce a localized panoramic image of a street with a camera and with a device for satellite-based position and time determination. Moreover, a preparation device is provided which prepares time data of the device for satellite-based position and time determination into a format recordable for the camera as coded time data, and forwards this to the camera. In the camera, a continuous film, simultaneously with the coded time data, is produced and issued as a film with time data. The film with time data thus issued can be stored in a corresponding device.

By means of this method it is possible to produce a continuous film by a vehicle traveling along a street and to store time data in this film. If, in addition, time and position data from the device for satellite-based position and time determination are stored at the same time, these two datasets render it possible in a subsequent preparation of the localized panoramic image of a street, that the precise positions of the objects or images shown in the film can be established.

In this, the coded time data can be produced as an acoustic signal and recorded on the audio track of the camera. This offers the advantage that no additional data have to be displayed, e.g., in the image portion of the camera. Moreover, it is relatively easy to use the audio track as it comes as a standard with most cameras but is not required for the recording of the street.

The coded time data can be produced as a continuous time data stream with a frame for one time-stamp in each case. In this way, the current time is co-recorded simultaneously on the camera, irrespective of at which image frame the camera recording happens to be at that moment. This improves the subsequent position determination of the data ascertained.

By preference, the coded time data are SMPTE-ltc-compliant, in which case in addition data on the millisecond and microsecond can be added as user bit load. Hence, what is available as a smallest unit is not only the second or the fraction of a second corresponding to the number of frames used, as according to the LSMPTE-ltc standard, but by way of milli- and microseconds an even greater accuracy can be achieved.

To further improve the accuracy and, in particular, prevent the coded time data produced by the preparation device from running too fast or too slow, the coded time data can be adjusted by means of a time signal, in particular a seconds signal, of the device for satellite-based position and time determination. Depending on whether time has elapsed too quickly or too slowly according to the preparation device, one or several frames of the time data stream can be stopped or repeated in order to thereby return to a time synchronous with the time of the device for satellite-based position and time determination.

Finally, a localized panoramic image of a street can be produced from the continuous film with the coded time data whilst using the position and time data of the device for satellite-based position and time determination. In doing so, the coded time data are used to determine the precise recording position for each frame of the continuous film. This is implemented in that the time-stamp is determined for each frame and, subsequently, by way of the equally recorded data of the device for satellite-based position and time determination, the corresponding position is ascertained. Due to the fact that, according to the coding used, even microseconds are recorded, a position determination to within a few centimeters is thus possible.

BRIEF DESCRIPTION OF DRAWINGS

The invention is explained in greater detail hereinafter by way of a schematic, exemplary embodiment with reference to the Figures, wherein show.

DETAILED DESCRIPTION

Figure 1:
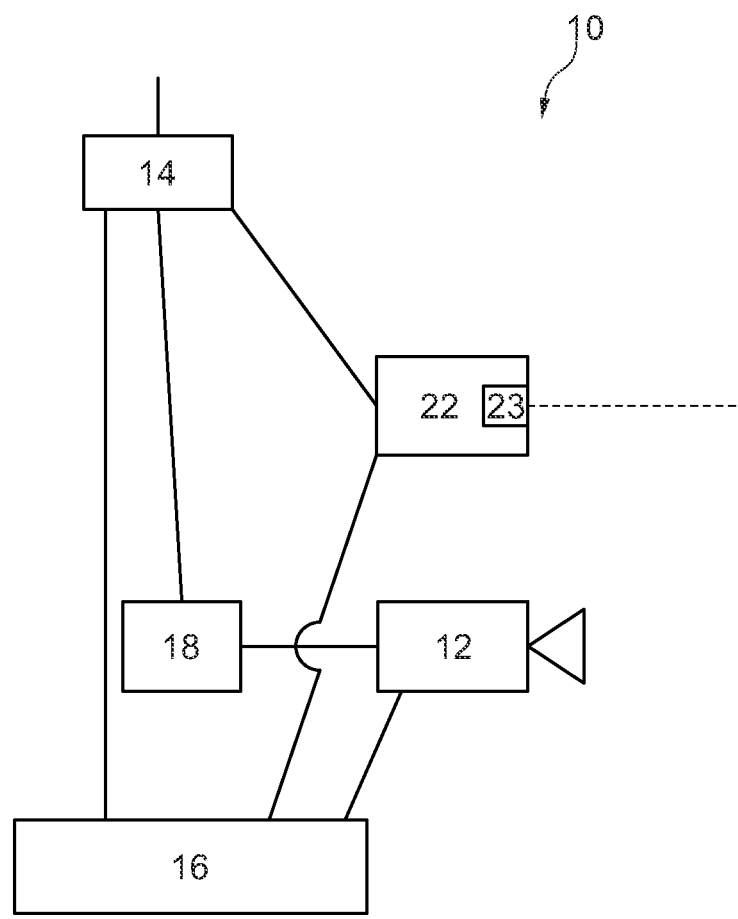
FIG. 1 a schematic view of an apparatus according to the invention for recording data to produce a localized panoramic image of a street.

FIG. 1 shows a highly schematic, simplified illustration of an apparatus 10 according to the invention for recording data to produce a localized panoramic image of a street 60.

This apparatus 10 has a camera 12 and a device 14 for satellite-based position and time determination. The device 14 for satellite-based position and time determination is a GPS-receiver, for example. In the case of a GPS signal, different satellites transmit a high-precision time signal, from which the corresponding position can then be ascertained in the GPS-apparatus or GPS-receiver.

Furthermore, in the apparatus 10 according to the invention a preparation device 18 is provided, which will be dealt with in greater detail in the following description. In addition, the apparatus 10 according to the invention has a LIDAR sensor unit 22 with a LIDAR sensor 23. Both the device 14 for satellite-based position and time determination and the camera 12 as well as the LIDAR sensor unit 22 are connected to a storage unit 16.

In the following the functioning of the apparatus 10 according to the invention will be dealt with in greater detail. The objective is to record data with the apparatus 10 according to the invention to produce a localized panoramic image of a street 60 (the street being visible in FIG. 5). For this purpose, the apparatus 10 according to the invention is placed in a vehicle that moves on a street. While the vehicle is moving a film is recorded by means of the camera 12. In addition to the actual image data, position and time data are ascertained via the device 14 for satellite-based position and time determination, which are to be harmonized with the film so that this information or these data that are stored on the storage unit 16 can subsequently be prepared for a localized panoramic image of a street 60.

For this purpose, at least a time signal of the device 14 for satellite-based position and time determination is transmitted to the preparation device 18. In the latter, the time signal is converted into a time data stream which is in turn present as an audio stream. The precise structure of this audio stream will be dealt with later on with reference to FIGS. 2, 3 and 4.

This audio stream is transmitted to an audio input of the camera 12. In the audio stream high-precision information on the current time is contained. The camera then records its film, with the audio data being present on the audio track as an acoustic signal. This film with the acoustic signal is then stored on the storage unit 16. For reasons of data protection, for example, this can be an encrypted memory or a server that directly stores the data in encrypted form so that they do not exist in raw form. In this way, it is possible to establish and store the precise point in time of the production of the film, i.e., of an image of the film. Parallel to this, the precise position, just as the precise time, is also transmitted from the device 14 for satellite-based position and time determination to the storage unit 16 and stored there.

Thus, in an evaluation implemented downstream it is possible, by way of the precise time code on the film and the parallel time code of the position data to determine the position, at which each corresponding image of the film was produced.

In addition, in the illustrated embodiment the apparatus 10 according to the invention has the LIDAR sensor unit 22 with the LIDAR sensor 23. However, this is not absolutely necessary.

In the embodiment illustrated here, at least time data are also transmitted from the device 14 for satellite-based position and time determination to the LIDAR sensor unit 22. The LIDAR sensor unit 22 prepares these data together with the distance, ascertained by the LIDAR sensor 23 from the LIDAR sensor to the next object, and also stores these by means of the storage unit 16.

Basically, it is also possible to transmit not only the time data of the device 14 for satellite-based position and time determination but also the position data. In this case either only the position data with the corresponding distance data or the time data, the position data and the distance data would be prepared by the LIDAR sensor unit 22 and stored in the storage unit 16. In analogy to the film data, these data can then be used to obtain further information for the panoramic image of a street. These too are of highly accurate localized nature so that the precise position can be determined.

Figure 2:
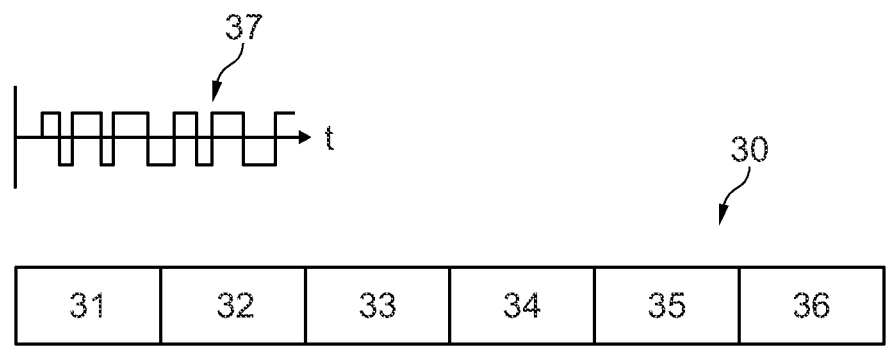
FIG. 2 the basic structure of a time data stream according to the invention.
Figure 2:
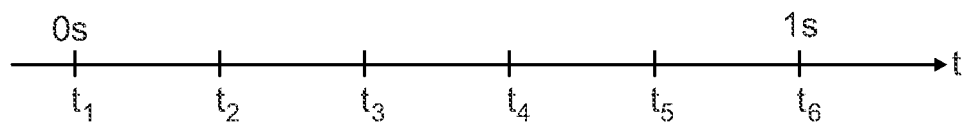

In the following the simplified structure of the time data stream 30 is explained in greater detail with reference to FIG. 2. Basically, the time data stream 30 constitutes an audio signal that codes a bit-sequence 37. The audio stream or time data stream is preferably designed to be SMPTE-ltc-compliant. According to this standard a specific point in time, i.e., a time-stamp, is in each case coded per frame 31, 32, 33, 34, 35 and 36. The simplified time data stream 30 illustrated in FIG. 2 only has five frames per second. In line with this standard, in each frame the current hour, minute and second, as well as the current frame, is coded in relation to the recorded data. In simplified terms, in the case of a recording with 24 images per second this means the information to which image in the respective second the corresponding frame 31, 32, 33, 34, 35, 36 belongs.

According to the invention this format was extended in that in the user bit load provided according to the standard, data on the millisecond and microsecond are additionally inserted.

The respective time-stamp that is coded in each frame 31, 32, 33, 34, 35 and 36 always corresponds to the start of the respective frame t1, t2, t3, t4, t5, t6. For the sake of simplification, it is assumed that only five images are produced per second, i.e., five frames are present in one second.

The preparation device 18 has a quartz crystal to produce the high-precision time signal that serves as a basis for the time data stream 30. Due to the fact that quartz crystals, just as other time measurement devices, are often temperature-dependent, it is necessary to adjust the time in each case. Especially in the application presented here, this is necessary because otherwise the high-accuracy localization of the images cannot be achieved. For adjustment the time signal of the device 14 for satellite-based position and time determination is used, for example. In this case, a seconds signal is used for this. This means that the device 14 for satellite-based position and time determination transmits a signal to the preparation device 18 every second. By means of this signal the time data stream 30 is then newly adjusted in each case.

In the following, the two cases are described in FIGS. 3 and 4, in which the time elapses too slowly or too fast on the preparation device 18.

Figure 3:
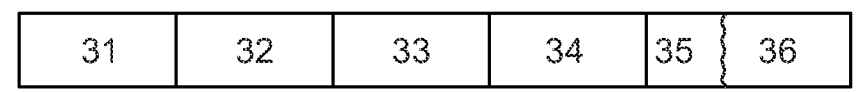
FIG. 3 the principle of dropping a time data stream frame.
Figure 3:
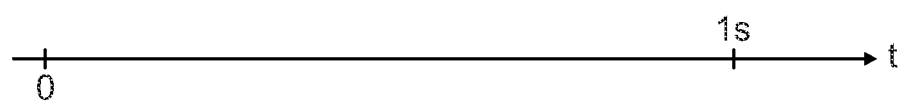

According to FIG. 3 the time calculated by the preparation device 18 is too slow. As a consequence, the second has already elapsed before the fifth frame 35 is terminated. According to the invention provision is then made for the transmission of this frame 35 to be stopped immediately and for transmission of the next, correct frame, i.e. frame 36 to be started.

Figure 4:
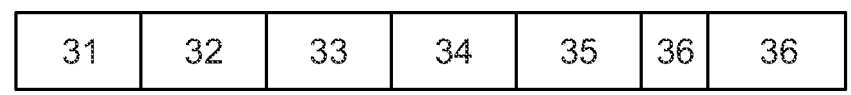
FIG. 4 the principle of renewed transmission of a time data frame.
Figure 4:
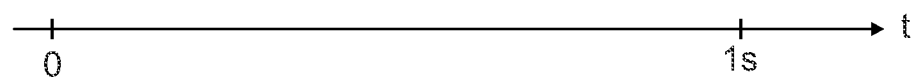

Conversely, in FIG. 4 the case is illustrated if the preparation device 18 runs too rapidly, i.e., if its time is too fast. In this case a new frame 36 already starts before the previous second has elapsed. This too is detected by means of the seconds signal emitted by the device 14 for satellite-based position and time determination. As a consequence, the transmission of the frame 36 is in turn stopped but is then started anew so that the time data stream 30 again runs synchronously to the time of the device 14 for satellite-based position and time determination.

Figure 5:
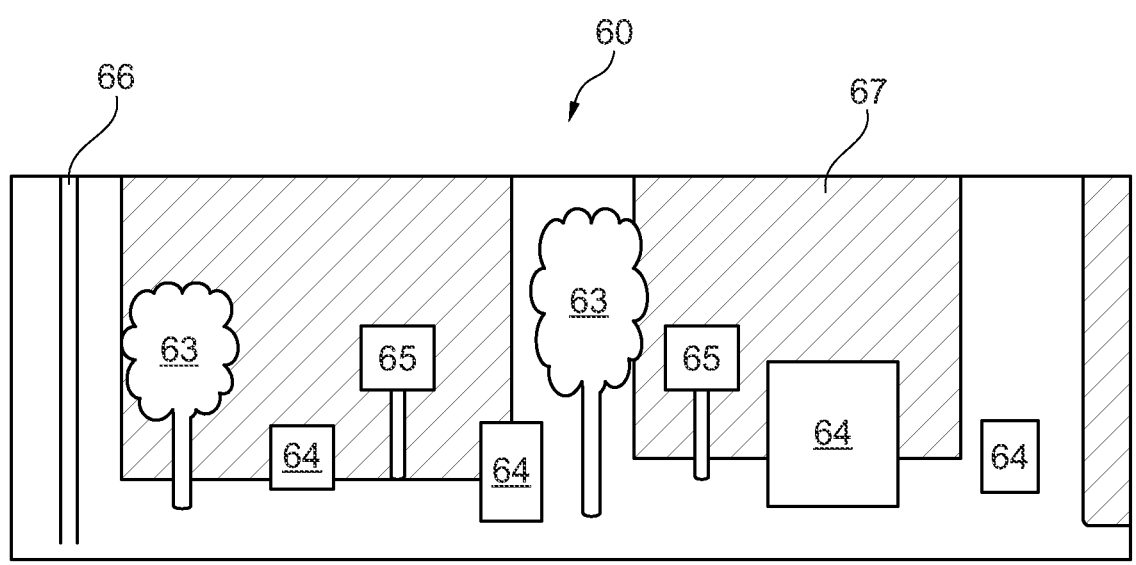
FIG. 5 a highly simplified panoramic image of a street.

Finally, in FIG. 5 a highly schematic example of a produced panoramic image of a street 60 is illustrated. When preparing the data the continuous film data produced by means of the camera 12 are prepared and assembled to a panoramic image of a street 60 that has no or hardly any optical distortions where possible. On the panoramic image of the street 60 individual objects 64, such as cars or trucks located on parking spaces, but also signs 65, can then be recognized. On these signs 65 parking information can be present, for example. Likewise, complete streetlamps 66 or sections thereof are illustrated for example. What is important here is that the curbside is present in order to ascertain a sufficient amount of data for static information for the parking management system 10. The objects shown hatched in FIG. 5 are for example houses 67 located in the background.

By way of the apparatus according to the invention employed pursuant to the method according to the invention, it is thus possible to efficiently generate data that can be used to produce a localized panoramic image of a street.

The invention claimed is:

1. An apparatus for recording data to produce a localized panoramic image of a street, the apparatus comprising:
    a camera having an audio input;
    a device for satellite-based position and time determination and generating satellite-based position and time determination data;
    a storage unit;
    a preparation device configured to prepare time data of the device for satellite-based position and time determination into a format recordable for the camera as coded time data,
wherein:
    the coded time data is forwarded to the audio input of the camera for recording;
    the camera is further configured to simultaneously record a continuous film and the coded time data as a film with time data;
    the storage unit is configured to store the film with the coded time data;
    the storage unit is further configured to store the satellite-based position and time determination data of the device for satellite-based position and time determination;
    the preparation device is further configured to produce the coded time data in accordance with a predetermined time code standard; and
    wherein the preparation device is configured to produce the coded time data as an acoustic signal containing audio data, and to forward the acoustic signal to the audio input of the camera while the camera is recording the continuous film such that the acoustic signal is recorded on a channel existing on the film as the camera is moving while imaging the street.

2. The apparatus of claim 1, wherein the predetermined time code standard comprises a Society of Motion Pictures and Television Engineers-longitudinal time code (SMPTE-ltc) time code standard, and wherein the coded data is produced to be SMPTE-ltc-compliant data, whilst inserting data on a millisecond and microsecond as a user bit load.

3. The apparatus according to claim 1, wherein the preparation device is further configured to produce the coded time data as a continuous time data stream with a plurality of time-stamps, and with a frame for each said time-stamp.

4. The apparatus according to claim 1, wherein the preparation device is further configured to adjust the coded time data by means of a time signal, the time signal forming a seconds signal, of the device for satellite-based position and time determination.

5. The apparatus according to claim 1, wherein for adjustment of the coded time data the preparation device is further configured to stop and/or repeat one or several frames in order to adjust the coded time data by means of the time signal of the device for satellite-based position and time determination.

6. The apparatus according to claim 1, further comprising:
a LIDAR sensor unit having a LIDAR sensor, the LIDAR sensor unit configured to:
receive position and/or time data from the device for satellite-based position and time determination; and
to transmit distance data generated by the LIDAR sensor together with the position and time data of the device for satellite-based position and time determination.

7. An apparatus for recording data to produce a localized panoramic image of a street, the apparatus comprising:
a camera having an audio input;
a device for satellite-based position and time determination and generating satellite-based position and time determination data;
a storage unit;
a preparation device configured to prepare time data of the device for satellite-based position and time determination into a format recordable for the camera as coded time data, the coded time data being an acoustic signal,
a LIDAR sensor unit having a LIDAR sensor:
wherein:
the coded time data is forwarded to the audio input of the camera for recording;
the camera is further configured to simultaneously record a continuous film with the acoustic signal representing the coded time data being included as a track of the continuous film, as the camera is being moved along the street while imaging the street;
the storage unit is configured to store the film with the coded time data;
the storage unit is further configured to store the position and the coded time data of the device for satellite-based position and time determination;
the preparation device is further configured to produce the coded time data in accordance with a predetermined time code standard; and
the LIDAR sensor unit is further configured to receive at least the coded time data and/or satellite-based position data of the device for satellite-based position and time determination, and in turn to issue distance data to an object, as ascertained by the LIDAR sensor, together with the coded time data and/or satellite-based position data, to be stored in the storage unit.

8. The apparatus of claim 7, wherein the predetermined time code standard comprises a Society of Motion Pictures and Television Engineers-longitudinal time code (SMPTE-ltc) time code standard, and wherein the time coded data is produced to be SMPTE-ltc-compliant data, whilst inserting data on a millisecond and microsecond as a user bit load.

9. A method for recording data to produce a localized panoramic image of a street, the method comprising:
using a camera having an audio input to image a street and produce a continuous film comprised of a plurality of separate, successively obtained, images;
using a device for satellite-based position and time determination to generate satellite-based position and time data;
using a preparation device to prepare time data received from the device for satellite-based position and time determination into an audio format receivable as an acoustic signal by the audio input of the camera, and recordable by the camera for enabling the camera to create coded time data in an audio track of the continuous film as the continuous film is being recorded while the camera is being moved along the street, with the coded time data being uniquely associated with each of the images recorded by the camera;
using the preparation device to forward the coded time data to the camera;
using the camera to produce a continuous film simultaneously with the coded time data as a film which includes the coded time data.

10. The method according to claim 9, further comprising producing the coded time data as a continuous time data stream with a separate frame for each one of a plurality of time-stamps in the continuous time data stream.

11. The method according to claim 9, further comprising forming the coded time data as Society of Motion Pictures and Television Engineers-longitudinal time code (SMPTE-ltc)-compliant data, and such that user bit load data on a millisecond and a microsecond are inserted in the coded time data.

12. The method according to claim 9, further comprising adjusting the coded time data by means of a time signal, in particular a seconds signal, of the device for satellite-based position and time determination.

13. The method according to claim 9, further comprising adjusting the coded time data by at least one of stopping or repeating one or several frames of the coded time data.

14. The method according to claim 9, further comprising producing a localized panoramic image of a street from the continuous film with the coded time data, whilst using the position and time data of the device for satellite-based position and time determination.

15. An apparatus for recording data to produce a localized panoramic image of a street, the apparatus comprising:
a camera having an audio input;
a device for satellite-based position and time determination and generating satellite-based position and time determination data;
a storage unit;
a preparation device configured to prepare time data of the device for satellite-based position and time determination into an audio signal having an audio format recordable y the camera as coded time data,
wherein:
the coded time data is forwarded to the camera for recording;
the camera is further configured to simultaneously receive the audio signal while recording a continuous film, such that the coded time data is recorded as a channel of the continuous film as the camera is moved along the street;
the storage unit is configured to store the film with the coded time data;
the storage unit is further configured to store the position and time data of the device for satellite-based position and time determination; and
the preparation device is further configured to produce the coded time data in accordance with a predetermined time code standard; and
the preparation device further being configured to at least one of:
stop, and then restart, transmission of the coded time data to the camera to resynchronize the coded time data with the satellite-based position and time determination data; or
to terminate transmission of a present frame of the coded time data as the present frame is being transmitted, and immediately begin transmitting a subsequent frame of coded time data;

to thus resynchronize operation of the preparation device with the satellite-based position and time determination data in instances of too slow or too rapid operation of the preparation device.

\* \* \* \* \*

UNITED STATES PATENT AND TRADEMARK OFFICE
CERTIFICATE OF CORRECTION

| | |
|---|---|
| PATENT NO. | : 11,778,329 B2 |
| APPLICATION NO. | : 17/176761 |
| DATED | : October 3, 2023 |
| INVENTOR(S) | : Christoph Fretter |

It is certified that error appears in the above-identified patent and that said Letters Patent is hereby corrected as shown below:

In the Specification

Column 3
Line 49, Summary    delete "SMPTE-Itc-compliant" and insert --SMPTE-1tc-compliant-- therefor In the Claims Column 10
Line 41, Claim 15    delete "y" and insert --by-- therefor Signed and Sealed this
Twenty-third Day of January, 2024

Katherine Kelly Vidal
*Director of the United States Patent and Trademark Office*